April 6, 1965   E. B. NICHOLS   3,177,426
SLOTTED-LINE WAVEGUIDE MEASURING MEANS
Filed Jan. 25, 1961   2 Sheets-Sheet 1

INVENTOR.
EDGAR B. NICHOLS
BY Jacob Trachtman
ATTORNEY

April 6, 1965 E. B. NICHOLS 3,177,426
SLOTTED-LINE WAVEGUIDE MEASURING MEANS
Filed Jan. 25, 1961 2 Sheets-Sheet 2
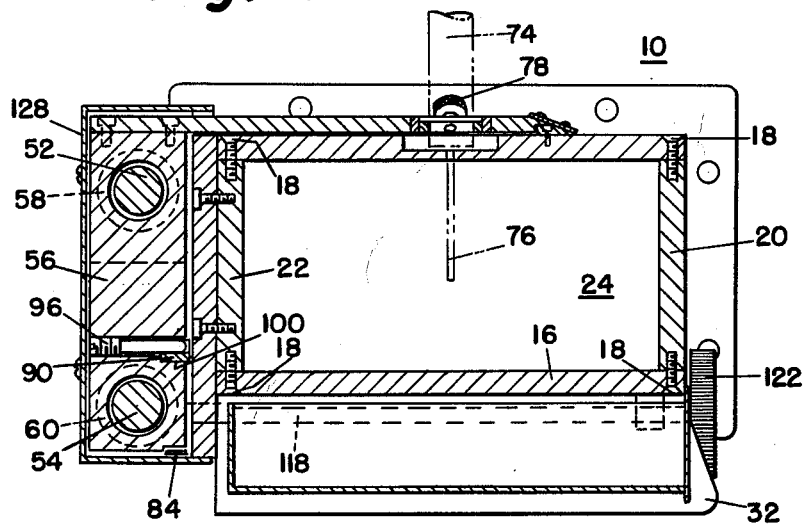
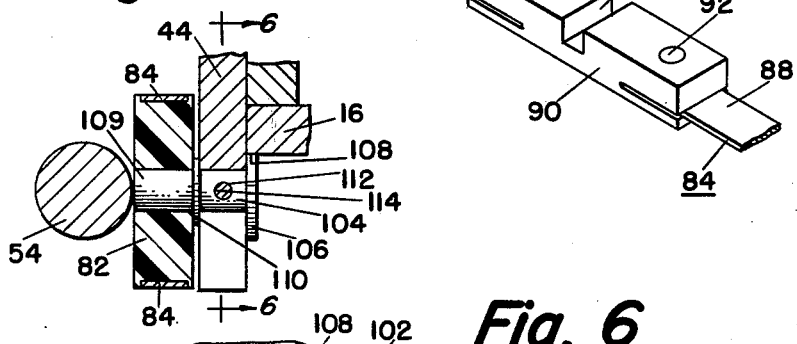
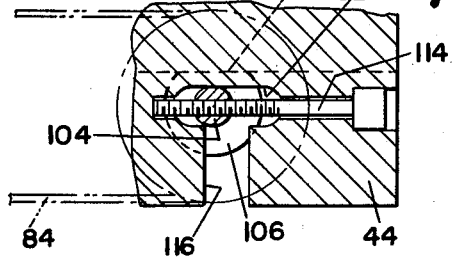
INVENTOR.
EDGAR B. NICHOLS
BY Jacob Trachtman
ATTORNEY United States Patent Office 3,177,426
Patented Apr. 6, 1965

3,177,426
SLOTTED-LINE WAVEGUIDE MEASURING
MEANS
Edgar B. Nichols, Moorestown, N.J., assignor to Nichols
Products Company, Inc., Burlington County, N.J., a
corporation of New Jersey
Filed Jan. 25, 1961, Ser. No. 84,874
3 Claims. (Cl. 324—58)

The invention relates to waveguide measuring means and more particularly to waveguide measuring means of the standing wave indicator type.

The waveguide measuring means is utilized for determining the voltage standing wave ratios of the energy being propagated along the waveguide. In determining this ratio, it is desirable to position a test probe within the waveguide with a high degree of accuracy.

It is therefore an object of the invention to provide a new and improved waveguide measuring means for determining standing wave ratios with high degrees of accuracy.

Another object of the invention is to provide a new and improved waveguide measuring means which is of rugged construction and readily allows the positioning of a test probe along a longitudinal slot of a waveguide section.

Another object of the invention is to provide a new and improved waveguide measuring means providing a positive positioning drive in either directon along the waveguide section for accurately positioning a test probe.

Another object of the invention is to provide a new and improved waveguide measuring means which may quickly be positioned with its probe supporting means to a desired approximate location from a more remote location after which it may be positioned more precisely by a vernier positioning means.

Another object of the invention is to provide a new and improved waveguide measuring means with a test probe position measuring means allowing accurate reading of the probe position along and within the section of a waveguide.

Another object of the invention is to provide a new and improved waveguide measuring means of high durability and precision requiring a minimum of servicing, adjustment, and maintenance.

The above and other objects of the invention are achieved by providing a waveguide measuring means comprising a waveguide section with a longitudinal slot along its top communicating with the cavity of the section.

A guide means including an anchor plate is secured along a side of the waveguide section with a pair of end plates secured at respective ends of the anchor plate. First and second parallel shafts, one positioned vertically above the other, have their ends secured by the end plates in a position to extend along the waveguide section.

A support means including a T-shaped block member has a first cylindrical bearing means extending through its top portion and a second cylindrical bearing means extending through its bottom portion. The first cylindrical bearing means movably receives the first shaft of the guide means while the second cylindrical bearing means movably receives the second shaft of the guide means. The support means has a probe supporting arm for retaining a measuring probe within the cavity of the waveguide section with the probe extending through the slot of the section. The arm extends from the top portion of the block member across the slot of the waveguide section for accurately positioning the probe arm with respect to the waveguide section.

A waveguide actuating means includes a pair of pulley wheels rotatably secured upon the anchor plate of the guide means in spaced relationship along the longitudinal direction of the waveguide section. A flexible band extends about the pulley wheels and has its ends secured with the T-shaped block member of the support means. A rotating means is linked with one of the pulley wheels for positively rotating the pulley wheel for actuating the band therearound to move the block member and arm along the waveguide section and controllably position the probe along the slot of the section.

A position measuring means is provided including a scale secured with the top of the waveguide section spaced from and extending along the slot of the section and in conjunction with an indexing means on the arm of the support means extending across the slot of the waveguide section which lies approximate a portion of the scale of the position measuring means for accurately indicating the position of the arm of the supporting means and the test probe.

The foregoing and other objects of the invention will become more apparent as the following detailed description of the invention is read in conjunction with the drawings, in which:

FIGURE 3 is an enlarged sectional view taken on the line 3—3 of FIGURE 1;

FIGURE 4 is an enlarged perspective view of the drive band connector and the end portions of the drive band of the actuating means;

FIGURE 5 is an enlarged fragmentary sectional view taken on the line 5—5 of FIGURE 2, and FIGURE 6 is a fragmentary sectional view taken on the line 6—6 of FIGURE 5.

Like reference numerals designate like parts throughout the several views.

Figure 1:
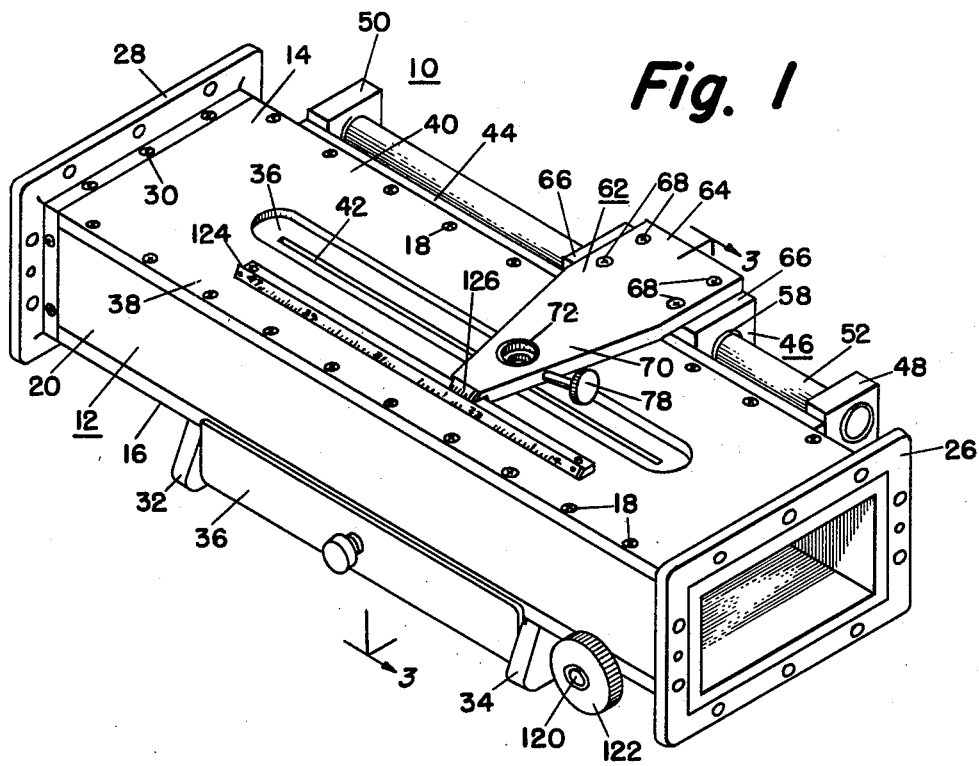
FIGURE 1 is a perspective view showing a waveguide measuring means embodying the invention, said means having its back cover removed.
Figure 2:
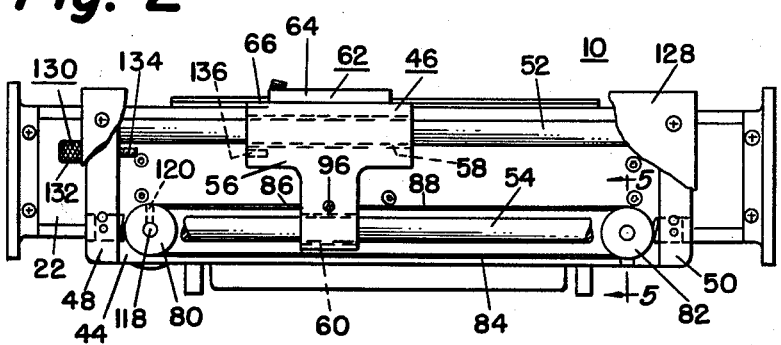
FIGURE 2 is a reduced rear elevational view of the measuring means shown in FIGURE 1, with portions of the back cover broken away.

Refer to FIGURES 1, 2, and 3 of the drawing, which show a waveguide measuring means 10 embodying the invention.

The waveguide means 10 comprises a waveguide section 12 formed of top and bottom metallic plates 14, 16 secured along their edges by screw means 18 with metallic vertical side plates 20, 22 to form a cavity 24 of substantially rectangular configuration within the waveguide section 12. The waveguide section 12 is provided with mounting flanges 26, 28 at each of its ends secured by the screw means 30 with the plates 14, 16, 20, and 22.

A pair of spaced feet 32, 34 are secured transversely with the bottom plate 16 of the waveguide section 12 for supporting the waveguide means 10 upon a horizontal bearing surface. An accessory drawer 36 is also slidably mounted under the waveguide section 12 between the feet 32, 34 for containing the test probe and other items required in connection with the use of the waveguide measuring means 10.

A top plate 14 of the waveguide section 12 is provided with a depressed longitudinally extending region 36 substantially equally spaced between the longitudinal edges 38, 40. The depressed region 36 of the plate 14 is provided with a longitudinal slot 42 communicating with the cavity 24 of the waveguide section 12. The slot 42 is adapted to receive therethrough and into the cavity 24, a test probe used in connection with the waveguide measuring means 10 for making tests.

The back vertical plate 22 of the waveguide section 12 has secured to it an anchor or base plate 44 of the probe support means 46. The support means 46 includes a pair of end plates 48, 50 secured at opposite ends of the anchor plate 44. The pair of parallel guide shafts 52, 54 are arranged one above the other and are secured to extend longitudinally along the waveguide section 12 by having their ends retained by the end plates 48, 50. The probe support means 46 comprises a T-shaped block member 56 having an upper cylindrical bearing means 58 which may be of the ball bushing type movably receiving the upper guide shaft 52 therethrough, and a second cylindrical bearing 60 in the lower portion of the T-shaped block member 56 for movably receiving the lower guide shaft 54 therethrough.

The supporting guide shafts 52, 54 rigidly position the block member 56 and only allow motion of the member 56 in the longitudinal direction along the shafts 52, 54. This accurate positioning of the block member 56 with respect to the waveguide section 12 is important for achieving the high accuracy attained by the waveguide measuring means 10.

The probe support means 46 is provided with an arm 62 which is secured at one end 64 with the top surface 66 of the block member 56 by the bolt means 68. The arm 62 is provided with a tapered portion 70 which extends in spaced relationship over and above the surface of the top plate 14 of the waveguide section 12. The arm 62 is provided with an opening 72 in its extending end 70 for receiving and accurately positioning the test probe 74 (shown by the dashed lines in FIGURE 3) upon positioning the probe end 76 through the slot 42 and into the cavity 24 of the waveguide section 12. A clamp screw 78 firmly secures the probe 74 within the opening 72 of the arm 70. The probe 74 is provided with screw means for adjusting and vertically positioning the probe end 76 within the cavity 24, while longitudinal movement of the probe support means 46 along the guide shafts 52, 54 positions the probe 74 along the waveguide slot 42.

An actuating means for the probe support means 46 comprises a pair of pulley wheels 80, 82 supported by the anchor or base plate 44 in longitudinally spaced relationship respectively approximate the end plates 48, 50. A flexible drive belt or band 84 which may be made of a metallic material passes under the bottom of the block member 56 in its lowest level, and extends about the pulley wheels 80, 82 with its ends 86, 88 secured with a connecting member 90 (see FIGURE 4) for being positionally fixed with the block member 56.

The end 88 of the band 84 may be permanently secured with the connecting member 90 by a rivet 92 while the other end 86 may be detachably secured with the member 90 by a removable screw element 94. The band member 84 has its ends 86, 88 and block member 90 fixed with respect to the block member 56 by a screw element 96 (see FIGURE 2) which retains the connecting member 90 by passing through the slot 98 of the member 90, while the member 90 is positioned within the slot recess 100 in the block member 56, as shown in FIGURE 3.

In order to readily position the band 84 about the pulleys 80, 82 and to adjust the tension of the band 84, the longitudinal position of the idler pulley wheel 82 may be varied. To accomplish this, the anchor or base plate 44 is provided with a longitudinally extending slot 102 along which the pulley shaft 104 of the pulley 82 is movable, as shown in FIGURE 5. The end of the shaft 104 is provided with a retaining disc 106 (see FIGURE 6) which has a flattened end 108 abutting the bottom plate 16 of the waveguide section 12 to prevent rotation of the shaft 104. The shaft 104 has an extending portion 109 for rotatably supporting the idler pulley wheel 82 and is also provided with a retaining washer 110 preventing motion of the shaft 104 in the axial direction. The shaft 104 is also provided with a threaded opening 112 which threadedly engages the pulley positioning screw 114.

In operation, rotation of the adjusting screw 114 moves the pulley wheel 82 in a longitudinal direction toward and away from its opposite pulley wheel 80 thereby increasing or decreasing the tension of the band 84 and allowing the tension to be set at a desired value, for optimum operation of the actuating means.

The idler pulley wheel 82 may also be removed from the anchor plate 44 by removing the screw 114 from threaded engagement with its shaft 104 and passing the shaft 104 downwardly through the opening slot 116 formed in the anchor plate 44.

The pulley wheel 80 constitutes a drive wheel for the band 84 by being secured with an extended shaft 118 (see FIGURE 3) by screw means 120, shown in FIGURE 2. The shaft 118 extends transversely under the bottom plate 16 of the waveguide section 12 with its end 120 (see FIGURE 1) projecting beyond the front vertical wall 20 of the waveguide section 12. The end 120 of the shaft 118 is secured with a vernier positioning knob 122 of the actuating means.

Thus, in operation, the arm 62 of the supporting means 46 and the test probe 74 which may be retained by the arm 62 are positioned along the longitudinal direction of the waveguide section 12 by direct manual actuation of the extending portions 70 of the arm 62 to a position approximate the desired location. After the arm 62 and its test probe 74 is approximately positioned along the slot 42 of the waveguide section 12, the vernier positioning knob 122 may be rotated to precisely locate and position the arm 62.

In order to precisely determine the location and position of the arm 62 along the slot 42 of the waveguide section 12, a position measuring means is provided comprising a scale 124 secured with the top plate 14 of the waveguide section 12 extending in the longitudinal direction along the slot 42. The scale 124 is parallel to and spaced from the slot 42 of the waveguide section 12 proximate the edge 38 and remote from the edge 40 of the plate 14 and the block member 56 of the support means 46. The tapered extending portion 70 of the arm 62 of the support means 46 is provided at its end with an indexing means 126 including a vernier scale positioned proximate a portion of the scale 124 of the positioning measuring means.

It is noted that the opening 72 for retaining the probe 74 is proximate to the indexing means 126 and thereby provides highly accurate readings for determining the position of the test probe and for positioning the test probe along the slot 42 of the waveguide section 12 with high precision. Another important and contributing factor for achieving high accuracy in postioning the test probe 74 is the use of the block member 56 with its parallel bearings 58, 60 in conjunction with the guide shafts 52, 54 and the actuating means having the band 84 and the vernier positioning knob 122.

Thus, the combination of the guide means including shafts 52, 54, and the block member 56, minimizes movement of the supporting means 46 including the arm 62 except in the longitudinal direction along the shafts 52, 54. The actuating means including the band 84 further provides a drive means which does not have back lash giving positive drive action in either direction and allowing precise positionng of the test probe 74 wth a maximum of ease and minimum of effort.

The waveguide measuring means 10 is also provide with a back cover 128 which effectively encloses the guide shafts 52, 54, as well as the block member 56 of the support means 46 and the band 84 and drive pulley wheels 80 and idler pulley wheel 82 preventing obstruction in the movement of the enclosed parts and shielding same from dust and foreign matter.

The accessory drawer 36 conveniently provides such tools and elements which may be necessary for using the waveguide measuring means 10.

In order to prevent damage to the support means 46 and actuating means of the waveguide measuring means 10, a lock screw 130 is provided which has a knurled end 132 extending outwardly from the end plate 48 and an inwardly extending threaded end 134. The end 134 of the screw 130 is adapted for threadedly engaging the threaded opening 136 of the block member 56 of the support means 46, when the block member 56 is proximate the end plate 48. In this locked position, the supporting means 46 is prevented from moving along the guide shafts 52, 54, thus preventing any possible damage to the waveguide measuring means during transportation or when same is not in use.

Thus, the waveguide measuring means 10, as described and illustrated, provides an instrument for obtaining highly accurate test results, while requiring a minimum of adjustment and maintenance, and being highly durable and stable in operation.

It will, of course, be understood that the description and the drawing, as herein contained, are illustrative merely, and that various modifications and changes may be made in the structure disclosed without departing essentially from the spirit of the invention.

What is claimed is:

1. A waveguide measuring means comprising a waveguide section with a longitudinal slot communicating with the cavity of said section; longitudinal guide means comprising a shaft extending along and secured with said section; support means retained by the shaft of said guide means for movement along said section including an arm for retaining a measuring probe within the cavity of said section with said probe extending through the slot of said section; actuating means engaging said support means for moving said support means along the shaft of said guide means and controllably positioning said probe along the slot of said section including a drive band secured with said support means and extending parallel to the shaft of said guide means; said actuating means including a pair of pulley wheels mounted in spaced relationship along the longitudinal direction of said section and said band is a flexible band extending about said pulley wheels and having its ends secured with said support means for moving said arm along the slot of said section with the rotary actuation of one of said pulley wheels; the band of said actuating means extending substantially parallel to the shaft of said guide means and is looped about said pulley wheels at its extremities to reverse the direction of movement of said band and positively fix the position of said supporting means along the slot of said section; the longitudinal position of at least one of the pulley wheels of said actuating means being adjustable for fixing the tension of said band; the arm of said supporting means extending across the slot of said section with the end of said arm having an indexing means for determining the postion of said arm and said probe along the slot of said section; and a scale spaced from and extending along the slot of said section with a portion in proximity with the indexing means of said arm; said guide means including a second shaft positioned parallel sad first shaft; said support means including a T-shaped member having said arm secured at its top portion, a first cylindrical bearing means extending through its top portion and movably receiving the first shaft of said guide means, and a second cylindrical bearing means extending through its bottom portion and movably receiving the second shaft of said guide means for accurately positioning said arm with respect to said waveguide section.

2. A waveguide measuring means comprising a waveguide section with a longitudinal slot along its top communicating with the cavity of said section; guide means including an anchor plate secured along a side of said section, a pair of end plates secured at respective ends of said anchor plate, and first and second parallel shafts with the first shaft positioned above the second shaft and both shafts extending along said section with their ends secured by said end plates; support means including a T-shaped block member having a first cylindrical bearing means extending through its top portion and movably receiving the first shaft of said guide means and a second cylindrical bearing means extending through its bottom portion and movably receiving the second shaft of said guide means, and an arm for retaining a measuring probe within the cavity of said section with said probe extending through the slot of said section; said arm extending from the top portion of said block member across the slot of said section for accurately positioning said arm and probe with respect to said section; actuating means including a pair of pulley wheels rotatably secured upon the anchor plate of said guide means in spaced relationship along the longitudinal direction of said section, a flexible band extending about said pulley wheels and having its ends secured with the block member of said support means, and rotating means linked with one of said pulley wheels for positively rotating said pulley wheel for actuating said band therearound to move the block member and arm along said section and controllably position said probe along the slot of said section; and position measuring means including a scale secured with the top of said section spaced from and extending along the slot of said section; said arm of said support means having an indexing means at the end extending across the slot of said section which lies proximate a portion of the scale of said position measuring means for accurately indicating the position of the arm of said supporting means and said probe with respect to said section.

3. Probe supporting and positioning means for a waveguide measuring means having a waveguide section provided with a longitudinal slot along its top communicating with the cavity of said section which comprises: guide means including an anchor plate for being secured along a side of a waveguide section, a pair of end plates secured at respective ends of said anchor plate, and first and second parallel shafts with the first shaft positioned above the second shaft and both shafts having their ends secured by said plates for extending in the direction along said section; support means including a block member having a first cylindrical bearing means extending through its top portion and movably receiving the first shaft of said guide means and a second cylindrical bearing means extending through its bottom portion and movably receiving the second shaft of said guide means, and an arm for retaining a measuring probe for positioning within the cavity of said section extending through the slot of said section; said arm extending from the top portion of said block member for being positioned across the slot of said section and accurately positioning said arm and a probe to be retained by said arm with respect to said section; and actuating means including a pair of pulley wheels rotatably secured upon the anchor plate of said guide means in spaced relationship in the direction along the shafts of said guide means, and a flexible band extending about said pulley wheels and having its ends secured with the block means of said support means for moving said support means along the shafts of said guide means with the rotary actuation of one of said pulley wheels.

References Cited by the Examiner

UNITED STATES PATENTS

| 2,748,345 | 5/56 | Phillips | 324—58 |
| 2,788,248 | 4/57 | Smith | 74—242.14 |
| 2,873,430 | 2/59 | Tomiyaso | 333—35 |
| 2,996,692 | 8/61 | Christensen | 333—98 |
| 3,032,713 | 5/62 | Flynn et al. | 324—58 |

HERMAN KARL SAALBACH, *Primary Examiner.*

BENNETT G. MILLER, *Examiner.*